(12) United States Patent
Le Goff et al.

(10) Patent No.: US 10,468,938 B2
(45) Date of Patent: Nov. 5, 2019

(54) ELECTRIC MOTOR, AND AIR BLAST DEVICE AND AIR-CONDITIONING AND/OR HEATING VENTILATION SYSTEM PROVIDED WITH SUCH A MOTOR

(71) Applicant: Valeo Systemes Thermiques, Le Mesnil Saint Denis (FR)

(72) Inventors: Morgan Le Goff, Epinay sur Orge (FR); Geoffroy Capoulun, Dammarie-les-Lys (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 424 days.

(21) Appl. No.: 15/303,230

(22) PCT Filed: Mar. 30, 2015

(86) PCT No.: PCT/EP2015/056854
§ 371 (c)(1),
(2) Date: Oct. 11, 2016

(87) PCT Pub. No.: WO2015/155043
PCT Pub. Date: Oct. 15, 2015

(65) Prior Publication Data
US 2017/0033640 A1 Feb. 2, 2017

(30) Foreign Application Priority Data
Apr. 11, 2014 (FR) ..................... 14 53248

(51) Int. Cl.
*H02K 1/14* (2006.01)
*H02K 1/18* (2006.01)
(Continued)

(52) U.S. Cl.
CPC ............ *H02K 5/18* (2013.01); *H02K 1/146* (2013.01); *H02K 1/187* (2013.01); *H02K 1/20* (2013.01);
(Continued)

(58) Field of Classification Search
CPC ........ H02K 1/20; H02K 1/2786; H02K 1/146; H02K 1/187; H02K 11/30; H02K 11/33
See application file for complete search history.

(56) References Cited

U.S. PATENT DOCUMENTS 6,107,708 A * 8/2000 Yamaguchi ........ B60H 1/00457
310/58
7,800,267 B2 * 9/2010 Sahara .................... F16C 25/08
310/401
(Continued)

FOREIGN PATENT DOCUMENTS

WO 2011/133024 A2 10/2011

OTHER PUBLICATIONS

International Search Report issued in corresponding application No. PCT/EP2015/056854 dated Jul. 7, 2015 (6 pages).
Written Opinion of the International Searching Authority issued in corresponding application No. PCT/EP2015/056854 dated Jul. 7, 2015 (5 pages).

*Primary Examiner* — Jeremy A Luks
(74) *Attorney, Agent, or Firm* — Osha Liang LLP

(57) ABSTRACT

The invention relates to an electric motor (100) comprising a stator (2) and a rotor (3), the rotor (3) being arranged around the stator (2), an element (9) for supporting said rotor (3) and said stator (2), a motor support (5) through which a stream of fluid flows, a radiator (8) and an electronic body (7), said radiator (8) being inserted between said motor (100) support (5) and said electronic body (7), characterised in that the element (9) for supporting the rotor (3) and the stator (2), and the radiator (8), form the same so-called bifunctional part (30).

10 Claims, 3 Drawing Sheets

(51) Int. Cl.
*H02K 1/20* (2006.01)
*H02K 1/27* (2006.01)
*H02K 11/33* (2016.01)
*H02K 11/30* (2016.01)
*H02K 5/18* (2006.01)
*H02K 7/14* (2006.01)
*H02K 9/00* (2006.01)
*H02K 5/06* (2006.01)

(52) U.S. Cl.
CPC ............ *H02K 1/2786* (2013.01); *H02K 5/06* (2013.01); *H02K 7/14* (2013.01); *H02K 9/005* (2013.01); *H02K 11/30* (2016.01); *H02K 11/33* (2016.01)

(56) References Cited

U.S. PATENT DOCUMENTS

| | | | |
|---|---|---|---|
| 7,859,155 B2 * | 12/2010 | Sahara | F16C 25/08 29/596 |
| 9,028,223 B2 * | 5/2015 | Kitamura | F04D 19/002 417/353 |
| 2002/0024264 A1 | 2/2002 | Matsumoto | |
| 2006/0076842 A1 * | 4/2006 | Park | H02K 9/06 310/62 |
| 2012/0299407 A1 | 11/2012 | Miyama et al. | |
| 2015/0145361 A1 * | 5/2015 | Peterson | H02K 1/187 310/71 |

* cited by examiner

ELECTRIC MOTOR, AND AIR BLAST DEVICE AND AIR-CONDITIONING AND/OR HEATING VENTILATION SYSTEM PROVIDED WITH SUCH A MOTOR

The present invention relates to the field of electric motors. The present invention concerns more particularly, but not exclusively, an electric motor used in an air blast device. An air blast device equipped with an electric motor according to the invention is used, for example, in a ventilation, heating and/or air conditioning system of a motor vehicle.

An electric motor is generally based on the interaction of a rotor with a stator, said rotor and said stator being mounted independently of each other in said motor. As a result of this a motor of this kind has the disadvantage of not guaranteeing a good coaxial relationship between the rotor and the stator. Now, a bad coaxial relationship between these two elements can lead to risks of malfunctioning of the motor such as an alternation of acceleration phases and slowing phases.

Thus an electric motor according to the invention makes it possible to ensure homogeneous and regular operation of the electric motor and thus to prevent an unsteady speed of rotation of the rotor around the stator.

The present invention therefore consists in an electric motor comprising a stator and a rotor, the rotor being arranged around the stator, an element for supporting said rotor and said stator, a motor support through which a stream of fluid, for example a stream of air, flows, a radiator and an electronic body for controlling said motor, said radiator being inserted between said motor support and said electronic body, characterized in that the element for supporting the rotor and the stator and the radiator form the same, for example so-called bifunctional, part.

The term "bifunctional" means that the part fulfils at least one first function of supporting the rotor and the stator and at least one second function of cooling the electronic body.

Thus said bifunctional part is in one piece. The fact that said bifunctional part is in one piece (or monoblock) makes it possible to circumvent the effect of having to position a radiator relative to a support element.

Thus when said bifunctional part is positioned between the electronic body and the motor support, the radiator will automatically contribute to correct positioning of the element for supporting the rotor and the stator and therefore to perfectly coaxial mounting of said rotor and said stator. The fact that the relative position of the radiator and the support element is fixed is advantageous because this makes it possible not to have to position a radiator relative to a support element at the level of the motor. Although constituting a single part, the radiator and the support element may be made from the same material or different materials.

The electronic body adapted to control the electric motor is generally an electronic circuit card that controls the operation of the electric motor.

The bifunctional part advantageously comprises:
a base serving as the radiator,
a hollow, for example cylindrical, part that includes an internal, for example cylindrical, channel that serves as the element for supporting the rotor and the stator.

In this way, the radiator is able to provide effective cooling over a large area whilst occupying a restricted space thanks to its small thickness.

The base is advantageously disk-shaped and advantageously lies in a plane that is perpendicular to the axis of revolution of the internal channel of the hollow part.

The bifunctional part is preferably made of metal. Thus the base serving as the radiator can cool the electronic body effectively by thermal conduction. Moreover, the fact that the bifunctional part is made of metal makes it possible to block electromagnetic radiation emitted by the electronic body, this electromagnetic radiation possibly interfering with the operation of the electric motor.

Moreover, the fact that the bifunctional part is made of metal makes it easy to ground the stator via said bifunctional part.

The bifunctional part is preferably made of aluminum. In this way the functional part is on the one hand light in weight and on the other hand a good thermal conductor.

The base of the bifunctional part is advantageously placed in contact with the motor support and the electronic body so that the stream of fluid passing through the motor support also cools the radiator and said radiator cools said electric body. The function of the radiator is to absorb the heat emitted by the electronic body and then to evacuate that heat via the fluid coming from the stream of fluid flowing through the motor support.

The stator is more particularly arranged around the hollow part and in contact with the external surface of said part, the internal channel being adapted to receive a central shaft of the rotor. Thus with this positioning the rotor turns around the stator.

The motor support preferably includes at least one passage leading to the motor to allow the stream of fluid passing through said support to travel toward said motor to cool it.

Thus the stream of fluid flowing through the motor support serves to cool both the radiator and the hot areas of the motor situated on the rotor and on the stator.

According to another possible feature, the stream of fluid flowing through said motor support is at least one of the following fluids: air, water, a refrigerant fluid (for example R134A, HFO 1234 YF, carbon dioxide, etc.), etc.

The invention consists secondly in a bifunctional part adapted to provide the radiator and the rotor and stator support functions in a motor according to the invention as described above.

The invention consists thirdly in an air blast device comprising at least one electric motor according to the invention as described above.

According to one possible feature, the air blast device according to the invention comprises at least one fan cooperating with said at least one electric motor.

An air blast device according to the invention has the advantage that it can be manufactured more rapidly and more simply because the radiator and the element for supporting the rotor and the stator constitute the same part. In fact, a part of this kind is manufactured in a single operation whereas two separate parts necessitate two manufacturing processes. A device of this kind also has the advantage that it can be assembled more easily, and in fact the accurate positioning of a single part in said device is always easier than that of two separate parts. It finally has the advantage of operating more homogeneously and more reliably, producing a stricter and more accurate coaxial relationship between the rotor and the stator of the electric motor.

The invention consists fourthly in a heating, ventilation and/or air conditioning system comprising at least one air blast device according to the invention as described above.

The invention will be better understood and other objects, details, features and advantages thereof will become more clearly apparent from the following description of one particular embodiment of the invention given by way of nonlimiting illustration only with reference to the appended drawings, in which.

Figure 1:
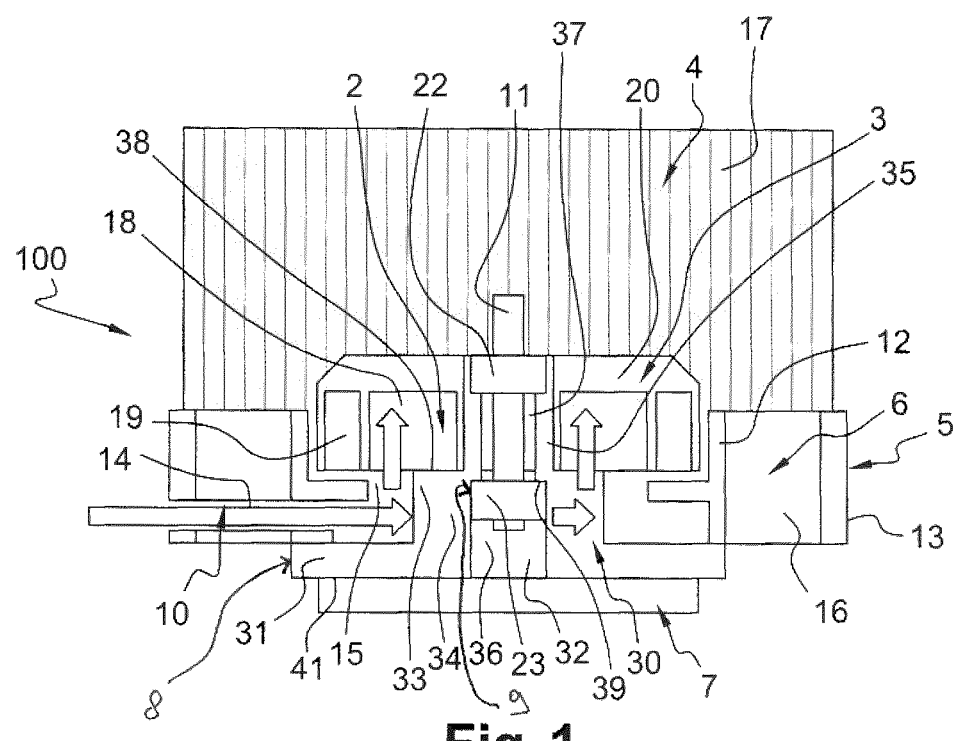
FIG. 1 represents a diagrammatic sectional view of an air blast device equipped with an electric motor according to the invention.

FIG. 1 is a diagrammatic sectional view of an air blast device 100 equipped with an electric motor 101 according to the invention. The electric motor 101 comprises a stator 2 and a rotor 3, a motor support 5, an electronic body 7 adapted to control said motor, a radiator 8, an element 9 for supporting said rotor 3 and said stator 2. The electric motor 101 comprises at least one channel 10 for circulation of a stream of fluid, for example a stream of air, for cooling said motor 101. Thus in the embodiment shown said electric motor 101 has a stream of air flowing through it.

It will be noted, however, that the fluid cooling the electric motor 101 can be a gas, a liquid or a two-phase gas-liquid mixture. The fluid is for example water, a refrigerant fluid (such as R134A, HFO 1234 YF, carbon dioxide, etc.), etc.

The air blast device 100 comprises at least one electric motor 101 and at least one fan 4 that cooperates with said at least one electric motor 101.

The radiator 8 and the support element 9 of the rotor 3 and the stator 2 of the electric motor 101 more particularly form a single so-called "bifunctional" part 30, so called because it has at least two functions, namely at least one first function of supporting the rotor 3 and the stator 2 and at least one second function of cooling the electronic body 7.

However, the so-called bifunctional part 30 can have other functions that will become apparent hereinafter in the nonlimiting embodiment described.

It will be noted that this part 30 is preferably made of metal, and more particularly of aluminum, which is a light material that is a good conductor of heat.

Thus the bifunctional part comprises:
a base 31 serving as the radiator 8,
a hollow, for example cylindrical, part 33 that serves as the support element 9 of the rotor 3 and the stator 2.
Moreover, the base 31 includes a central opening 32.

It will moreover be noted that the base 31 is preferably thin, i.e. that the base 31 has a thickness between 2 and 15 mm inclusive.

In the embodiment shown, the base 31 has a circular shape, but it may have a rectangular, square, elliptical, triangular, etc. shape. The shape of the base 31 of the bifunctional part 30 is a function of the shape of the elements contiguous with said base 31.

The rotor 3 is preferably arranged around the stator 2, rotation of said rotor 3 around said stator 2 driving rotation of a transmission shaft 11 to drive the fan 4 fastened to said shaft 11.

The fan 4 of the air blast device 100 comprises at its periphery a plurality of inclined fins 17 so that rotation of said fan 4 by the electric motor 101 contributes to the production of the air blasted by said fins 17.

In the embodiment shown the motor support 5 is a part of circular shape but said support may assume other shapes such as a rectangular, triangular, elliptical, etc. shape.

According to the particular embodiment shown in FIG. 1, the motor support 5 comprises a peripheral groove 6 and decoupling elements 16.

The motor support 5 further comprises an interior ring 12 and an exterior ring 13 forming between them an annular space constituting the peripheral groove 6. The support 5 also comprises said at least one channel for circulation of a stream 10 of air. In the embodiment shown, the latter comprises a lateral air inlet channel 14 and at least one passage 15 oriented toward the electric motor 101 to allow air coming from said channel 14 to travel toward said motor 101 in order to cool it.

The decoupling elements 16 form a flexible area situated in the groove 6 delimited by the two rings 12, 13. The function of said flexible area is to damp the vibrations of the electric motor in order that they do not propagate into the motor vehicle and more particularly into a dashboard of said vehicle.

This area may interchangeably be formed by a damping foam or by flexible plastic spacers 16 bearing against the two rings 12, 13.

The electronic body 7 adapted to control said motor 101 is generally an electronic circuit card that controls the operation of the electric motor 101, i.e. that it controls the speed of said motor 101, for example.

For its part, the stator 2 is an annular part formed of a plurality of windings 18. The rotor 3 is similar to a cover comprising a hollow cylindrical body 19 and a wall 20, for example a convex wall, that blocks said body 19 at one of its two ends. As can be seen more particularly in FIG. 2, in the assembled position the stator 2 is arranged in the hollow cylindrical body 19 of the stator 3. The rotor 3 also includes a shaft that passes through the wall 20 at its center and that corresponds to a transmission shaft 11. A part of said shaft 11 extends inside the cylindrical body 19, coinciding with the axis of revolution of said cylindrical body 19, and another part of said shaft 11 extends toward the exterior of said rotor 3 and serves to support the fan 4.

Moreover, the rotor 3 is mounted in the portion of the part 30 serving as the support element 9, that is to say in the hollow part 33, so that the part of its shaft 11 that extends inside its hollow body 19 comes to occupy the internal channel of said support element 9 and so that its wall 20 and said body 19 come to cap the stator 2, like a cover.

Two bearings 22, 23 of hollow cylinder shape are inserted into the internal channel of the support element 9 around the shaft 11 of the rotor 3 to favor the rotation of said rotor 3 in said support element 9. It will be noted that said bearings 22 and 23 may be ball bearings, roller bearings, needle roller bearings, etc.

The fan 4 therefore extends the rotor 3 by being mounted coaxially with said rotor 3 on its shaft 11.

According to an embodiment shown in FIG. 5, the base 31 of the bifunctional part 30 includes raised patterns intended to cooperate with complementary raised patterns on parts adjacent the motor 101. The cooperation of the raised patterns of the parts adjacent the motor 101 with the raised patterns on the base 31 makes it possible to facilitate the positioning of the bifunctional part 30 in said motor 101. In fact, these complementary raised patterns serve as poka yoke means.

Moreover, the base 31 comprises a certain number of orifices each adapted to receive a screw for fixing the bifunctional part 30 into the electric motor 101 or for fixing other elements to said bifunctional part 30.

The base 31 is extended by at least one hollow part 33. Said hollow part 33 is of cylindrical shape, for example.

In the embodiment shown, the hollow part 33 comprises a first section 34 extended by a second section 35.

In the embodiment shown, the first and second sections 34 are of cylindrical shape but the hollow part 33 may be made up of one or more sections with different shapes and/or diameters.

The first section 34 is situated between the base 31 and the second section 35, the outside diameter of said base 31 being greater than the outside diameter of said first section 34 that is itself greater than the outside diameter of said second section 35.

The first section 34 and the second section 35 each comprise an internal cylindrical channel 36 and 37 continuous with one another, the diameter of the internal channel 36 of the first section 34 being greater than the diameter of the internal channel 37 of the second section 35 (the internal channel 36 and the arrangement of the two channels 36 and 37 can more particularly be seen in FIG. 1).

It is to be noted that the diameter of the internal channel 36 of the first section 34 is equal to the diameter of the central opening 32 in the base 31.

The internal channel 37 of the second section 35 ends in a flared cylindrical part the diameter of which is equal to the diameter of the internal channel 36 of the first section 34. The two internal channels 36, 37 are coaxial.

The first section 34 and the second section 35 define between them an external shoulder 38. Similarly, the internal channels 36, 37 of the two sections 34, 35 define between them an internal shoulder 39 (more particularly visible in FIG. 1). The base 31 is disk-shaped and lies in a plane that is perpendicular to the axis of revolution of the cylindrical hollow part 33 (or perpendicular to the axis of revolution of the internal channels 36, 37), extending said base 31.

Figure 2:
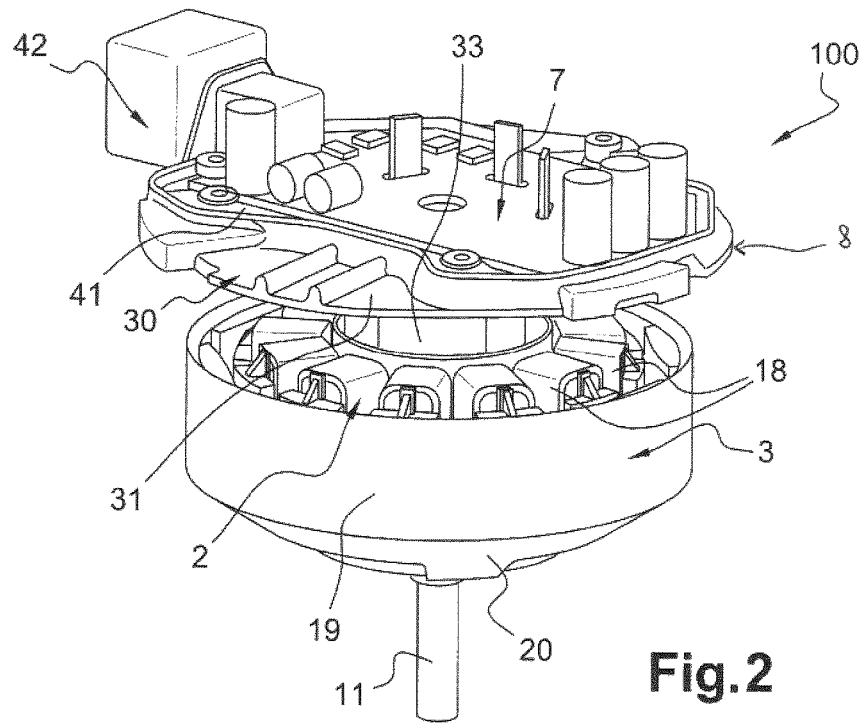
FIG. 2 is a perspective view of an electric motor and a bifunctional part of the air blast device from FIG. 1.
Figure 3:
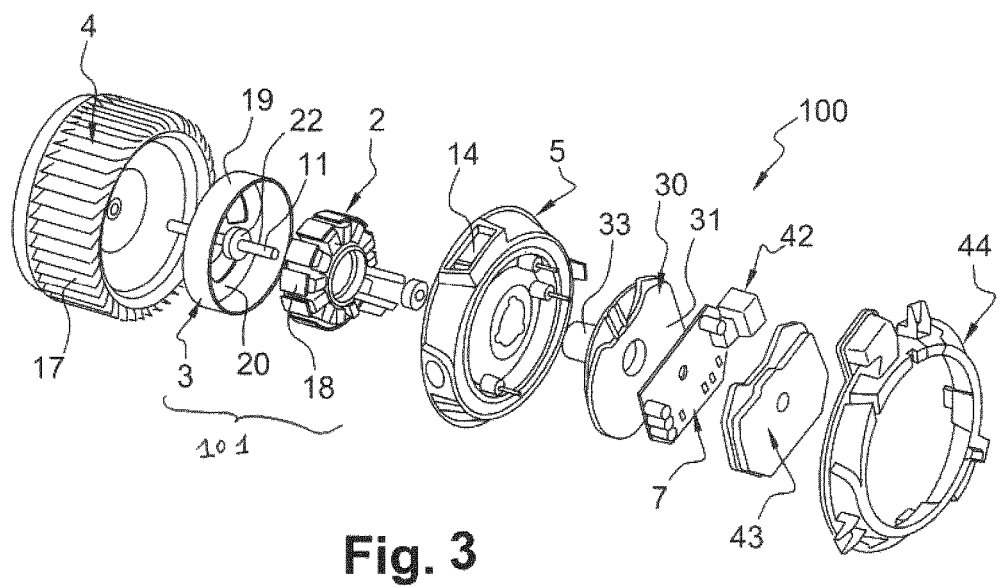
FIG. 3 is an exploded perspective view of the air blast device from FIG. 1.

As shown in FIGS. 2 and 3, the stator 2 covers around the second section 35 and comes to abut against the external shoulder 39. The shaft 11 of the rotor 3 occupies the internal channel 37 of the second section 35, the flared part and a portion of the internal channel 36 of the first section 34. The two bearings 22, 23 cover around the shaft 11 of the rotor 2, respectively in the flared part of the internal channel 37 of the second section 35 and in the internal channel 36 of the first section 34, coming to bear against the internal shoulder 39.

Referring to FIG. 3, the electronic circuit card 7 and an electrical connector 42 connected to said card 7 are pressed against a face 41 of the base 31 opposite that extended by the hollow part 33.

Figure 4:
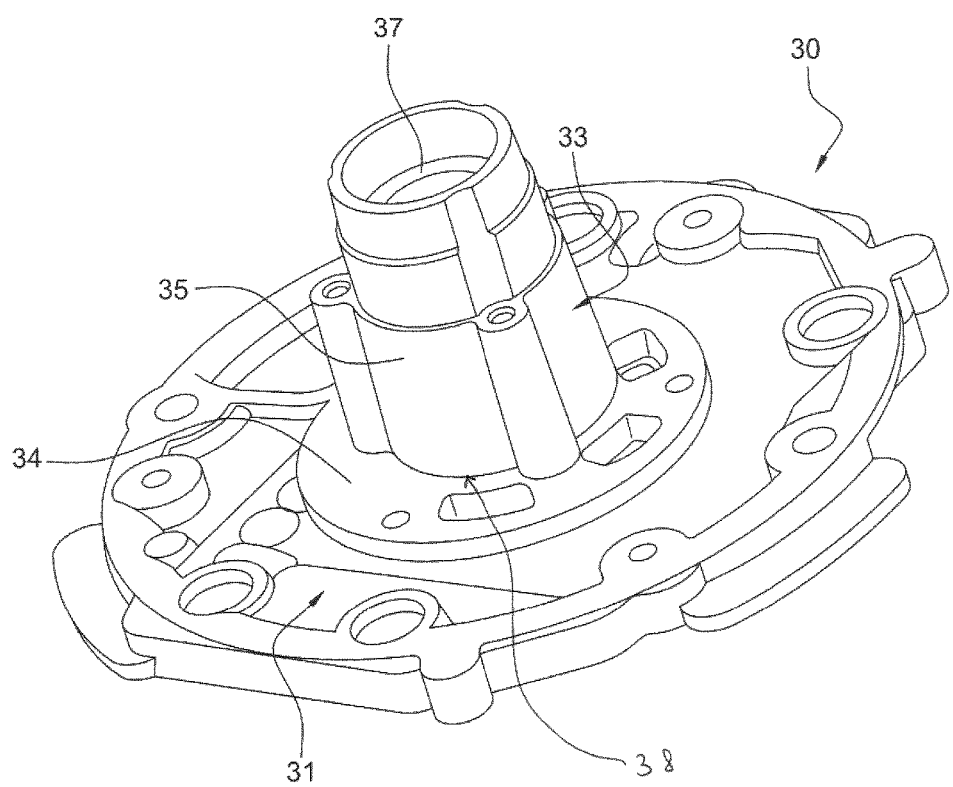
FIG. 4 is a perspective view of a bifunctional part according to one possible embodiment of the invention.

Referring to FIG. 4, the bifunctional part 30 combining the radiator and the support for the rotor 3 and the stator 2 makes possible rigorous and accurate positioning of said support by means of the radiator which comes to be stacked naturally on the other elements of the electric motor 101.

Accordingly, assuming the radiator is correctly positioned in the electric motor 101, it therefore follows that the support element 9 of the rotor 3 and the stator 2 is also correctly positioned. As shown in FIG. 3, the electric motor 101 according to the invention also comprises a cap 43 protecting the electronic circuit card 7 and an adapter ring 44 surrounding said cap 43.

Note that if the cap 43 is made from a metal, or is metal-plated, it is then possible to ground said cap 43 via the part 30.

Accordingly, when the electric motor 101 is activated, the rotor 3 is caused to rotate about the stator 2, driving simultaneous rotation of the fan 4, which then produces an air blast. Moreover, air external to the device 100 penetrates into the lateral channel 14 of the motor support 5 in order on the one hand to cool the radiator 8 and therefore to maintain the electronic circuit card 7 at a relatively low temperature, that is to say a temperature less than or equal to 90° C., and on the other hand to cool the hot areas of the motor 101 situated on the rotor 3 and on the stator 2.

It will be noted that the air blast device 100 described above may advantageously be used in a heating, ventilation and/or air conditioning system (not represented). The air blast device 100 is for example arranged near an air inlet of the heating, ventilation and/or air conditioning system in order to enable circulation in said system of air coming from the outside.

The invention claimed is:

1. An electric motor comprising:
   a stator;
   a rotor, the rotor being arranged around the stator;
   an element for supporting said rotor and said stator;
   a motor support through which a stream of fluid flows;
   a radiator; and
   an electronic body,
   wherein said radiator is inserted between said motor support and said electronic body;
   wherein the element for supporting the rotor and the stator and the radiator form a bifunctional part that is in one piece,
   wherein the bifunctional part comprises:
      a base serving as the radiator, and
      a hollow part that includes an internal channel that serves as the element for supporting the rotor and the stator, and
   wherein the base of the bifunctional part is placed in direct contact with the motor support and the electronic body so that the stream of fluid passing through the motor support also cools the radiator and said radiator cools said electric body.

2. The motor as claimed in claim 1, wherein the base is disk-shaped and lies in a plane that is perpendicular to the axis of revolution of the internal channel of the hollow part.

3. The motor as claimed in claim 1, wherein the stator is arranged around the hollow part and in contact with an external surface of said hollow part, and wherein the internal channel is adapted to receive a central shaft of the rotor, said rotor being positioned around said stator.

4. The motor as claimed in claim 1, wherein the bifunctional part is made of metal.

5. The motor as claimed in claim 4, wherein the bifunctional part is made of aluminum.

6. The motor as claimed in claim 1, wherein the motor support includes at least one passage leading to the motor to allow the stream of fluid passing through said support to travel toward said motor to cool it.

7. A bifunctional part in an electric motor, comprising:
   an element that supports a stator and a rotor of the electric motor, the rotor being arranged around the stator; and
   a radiator of the electric motor, wherein the electric motor further comprises a motor support through which a stream of fluid flows, and an electric body;
   wherein said radiator is inserted between said motor support and said electronic body;
   wherein the bifunctional part is in once piece and comprises:
      a base serving as the radiator, and
      a hollow part that includes an internal channel that serves as the element for supporting the rotor and the stator, and
   wherein the base of the bifunctional part is placed in direct contact with the motor support and the electronic body so that the stream of fluid passing through the motor support also cools the radiator and said radiator cools said electric body.

8. An air blast device comprising at least one electric motor, the electric motor comprising:
   a stator;
   a rotor, the rotor being arranged around the stator;
   an element for supporting said rotor and said stator;
   a motor support through which a stream of fluid flows;
   a radiator; and
   an electronic body,
   wherein said radiator is inserted between said motor support and said electronic body;
   wherein the element for supporting the rotor and the stator and the radiator form a bifunctional part that is in one piece,
   wherein the bifunctional part comprises:
      a base serving as the radiator, and
      a hollow part that includes an internal channel that serves as the element for supporting the rotor and the stator, and
   wherein the base of the bifunctional part is placed in direct contact with the motor support and the electronic body so that the stream of fluid passing through the motor support also cools the radiator and said radiator cools said electric body as claimed in claim 1.

9. The device as claimed in claim 8, further comprising at least one fan cooperating with said at least one electric motor.

10. A heating, ventilation and/or air conditioning system including at least one air blast device as claimed in claim 8.

\* \* \* \* \*